(No Model.)
E. TURNEY.
VEHICLE TIRE RIVET.
No. 497,222. Patented May 9, 1893.
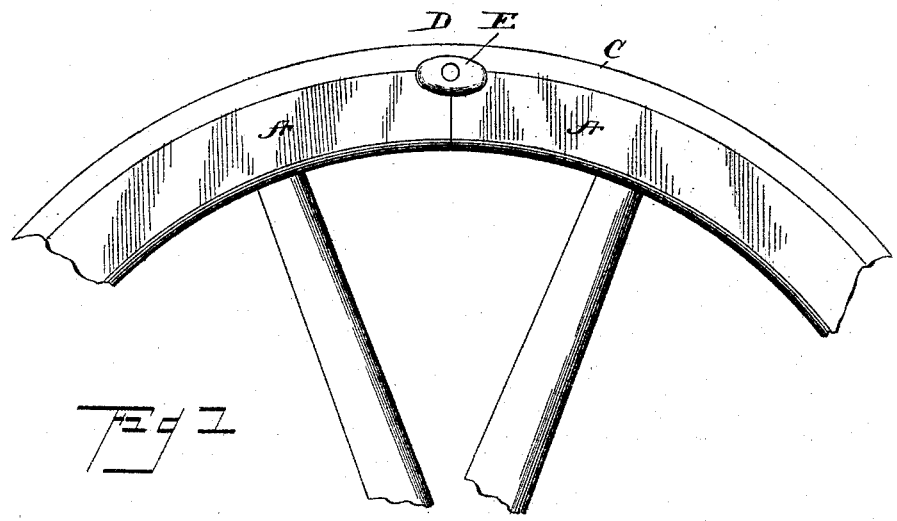
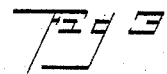
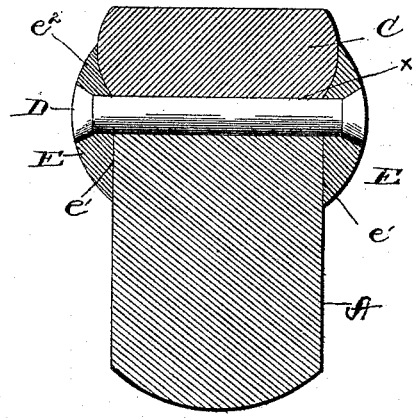
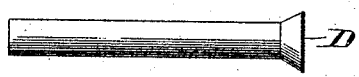
Witnesses
Inventor
Ellsworth Turney
By his Attorney

UNITED STATES PATENT OFFICE.

ELLSWORTH TURNEY, OF FAIRFIELD, IOWA.

VEHICLE-TIRE RIVET.

SPECIFICATION forming part of Letters Patent No. 497,222, dated May 9, 1893.

Application filed July 19, 1892. Serial No. 440,515. (No model.)

*To all whom it may concern:*

Be it known that I, ELLSWORTH TURNEY, a citizen of the United States, residing at Fairfield, in the county of Jefferson and State of Iowa, have invented certain new and useful Improvements in Tire-Rivets; and I do hereby declare the following to be a full, clear, and exact description of the invention, such as will enable others skilled in the art to which it appertains to make and use the same.

Figure 1, is a side elevation of a portion of a carriage wheel showing present invention as used. Fig. 2, is a cross section showing tire, felly and rivet. Fig. 3, is a detail showing one of the washers and the rivet before being applied.

This invention is designed to afford better means for uniting the fellies and tire of vehicle wheels than has heretofore been known or used. It has heretofore been usual in making the wheel after the tire is set to bore a hole at the junction of the two sections of the fellies, which is the usual place for applying the rivets. This hole is up against the tire, and in the top part of the rim of the fellies. The rivet is now passed through the hole and the countersunk burr applied and the whole then riveted down solidly, or as nearly so as possible. The tire rivet is generally used with wheels having a projecting tire, and this tire has usually a round edge. But the very serious objection to this method is that if the shape of the head of the rivet and of the burr is retained there will be a space between both the burr and the rivet head, the fellies and tire. The parts not fitting closely, whenever the tire is at all loosened the tendency is to become still further loose and to shake and jostle the burr and the head so that eventually one or the other snaps off. This result is still further hastened by the unnatural position of the angle between the head and the burr and the shank of the rivet. If the burr is set at all tight, the tendency is to bend the shank of the rivet near the head and also near the burr. This renders the shank still more liable to fracture as the grain of the metal is thereby disturbed. Again, in the common form, the edge of the burr and the head being somewhat sharp, set into the felly, and as the tire works, this edge cuts into and injures the felly and to that extent that the rivet is loosened and the inclination of the head and burr to the axis increased and fracture a great deal more liable. Again, these rivets, as commonly used are expensive to make; owing to the unusual strain put upon them they must be of the best material; and to the fact that a head is formed on them, this is a considerable item of expense. As these rivets are usually applied to vehicles which are designed for especially rough use they should be so arranged with reference to the felly and tire as to bear solidly throughout their bearing surface upon the respective part of felly and tire that they touch. Thus the washer presents to the edge of the tire about the same area of bearing surface that it does to the felly. Its shape and adaptation in use are such that the rounded edge does not extend beyond the tire. This is one point of advantage of my invention over the common rivet. In that rivet, the bearing surface is flat, and, since the tire projects over the felly, there are but two bearing points of the head and burr to wit one upon the edge of the tire and the other upon the felly, upon the surface of which the sharp edges of the head and burr respectively press, the result being that the head and burr chafe into the wood, and the rigidity of the whole is greatly diminished. The present invention overcomes this defect.

In the accompanying drawings A, denotes the fellies of the wheel, B, the spokes, and C, the tire. At a point in the junction of two portions of the felly, and close under the tire is bored a hole $x$. This is designed to receive the headed rivet D, shown in Fig. 3. The two riveting burrs or washers E, which are duplicates are oblong in shape and have countersunk holes $e$, as shown, one designed to receive the head of the common counter-sunk headed rivet D, and the other to receive the riveted end on the other side of the rim and tire. The outer surface of these burrs may be as shown, but not of necessity. The inner surface consists of two sections $e'$, $e^2$. The part $e'$, from the upper side of the hole $x$, to the opposite rim is applied so as to fit to the surface of the felly. The other part $e^2$, from the outside of the hole to the nearest rim is concave and of such shape as to receive the edge of the tire. The round-edge tire is in almost universal use, but if the flat-edge tire is used, the concavity would be a shoulder so as to fit and hold the tire. However, the rivet is not necessarily made in this shape; that is, with the ordinary counter-sunk head rivet and the two washers; but it may be made with a head having a concavity on one side and the general shape substantially the same as the common or California rivet.

The method of application to the wheel is substantially the same as that of the ordinary rivet; that is, the hole is bored after the tire is set, at the same place, one washer or burr adjusted to the rivet, the rivet driven through the hole, the other washer or burr adjusted, and the whole mass solidly riveted together. It will be seen that thus riveted there will be no strain whatever except in the direction of greatest resistance. There is no pressure brought to bear upon the shank at any other part except in the direction of its length. There is no bending of any of the parts. Every part of the burr or washer fits solidly and immovably against the corresponding part of tire and felly, thus greatly increasing the bearing surface, which is still further increased and the wheel more solidly pressed by the oblong shape. But I do not wish to confine myself to this oblong shape. It will be seen that when these burrs are firmly set against the tire it will be securely tightened upon the fellies and there can be no loosening as there are no sharp edges to work into the wood, and thus give any play whatever to the tire, but the tire is held solidly in place as long as the heads themselves are fast; and, as there is no room for play, and as the resistance is in the line of greatest strength, it will be seen that this tendency of the tire to become loose and to break off the heads of the rivets is reduced to a minimum.

Another advantage of this device over the one in ordinary use is that in making the ordinary head the rivet is upset. This destroys the grain of the metal and renders the rivet more liable to fracture at the junction of the head and shank. In this new device, where the two washers and ordinary counter-sunk rivet are used, this line is not destroyed, and, of course, the resistance is increased to a maximum.

What I claim is—

1. In combination with the tire and fellies, the latter having a hole at the point of their junction and near to the tire, the washers E, each shaped at $e'$, and $e^2$, to fit close upon the fellies and tire, and the headed bolt D, by which said washers are united and held in place, and said tire tightened upon the fellies.

2. The above described washer having a portion of its inner surface shaped and adapted to fit upon the felly, and the other portion concave and adapted to fit snugly upon the side of the tire, whereby the washer presents to the fellies and tire about the same area of bearing surface and bears solidly throughout its entire inner surface upon the parts of the fellies and tire it touches, substantially as set forth.

In testimony whereof I affix my signature in presence of two witnesses.

ELLSWORTH TURNEY.

Witnesses:
  H. F. BOOKER,
  P. E. PARSONS.